US008652394B2

(12) United States Patent
Sano et al.

(10) Patent No.: US 8,652,394 B2
(45) Date of Patent: Feb. 18, 2014

(54) METHOD OF MANUFACTURING PNEUMATIC TIRE

(75) Inventors: Takuzou Sano, Kanagawa (JP); Noboru Takada, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 312 days.

(21) Appl. No.: 13/318,196

(22) PCT Filed: Jun. 17, 2009

(86) PCT No.: PCT/JP2009/061053
§ 371 (c)(1),
(2), (4) Date: Oct. 31, 2011

(87) PCT Pub. No.: WO2010/128565
PCT Pub. Date: Nov. 11, 2010

(65) Prior Publication Data
US 2012/0049418 A1 Mar. 1, 2012

(30) Foreign Application Priority Data

May 7, 2009 (JP) ................................ 2009-112877

(51) Int. Cl.
*B29C 51/10* (2006.01)
(52) U.S. Cl.
USPC ............................ 264/501; 264/571; 156/133
(58) Field of Classification Search
None
See application file for complete search history.

(56) References Cited

U.S. PATENT DOCUMENTS

| 4,529,461 | A | * | 7/1985 | Caretta et al. | 156/124 |
| 4,983,239 | A | * | 1/1991 | Holroyd et al. | 156/123 |
| 6,332,999 | B1 | * | 12/2001 | Caretta | 264/501 |
| 6,651,716 | B1 | * | 11/2003 | Brown et al. | 152/564 |
| 6,663,735 | B2 | * | 12/2003 | Hashimura et al. | 156/133 |
| 6,673,184 | B1 | * | 1/2004 | Brown et al. | 156/133 |

(Continued)

FOREIGN PATENT DOCUMENTS

| JP | 58-078740 A | 5/1983 |
| JP | 2001-88143 A | 4/2001 |

(Continued)

OTHER PUBLICATIONS

International Search Report of corresponding International Application No. PCT/JP2009/061053, dated on Aug. 25, 2009.

*Primary Examiner* — Monica Huson
(74) *Attorney, Agent, or Firm* — Global IP Counselors (57) ABSTRACT

A cylindrical-shaped body is formed by mounting a carcass to the outer peripheral side of a film formed of a thermoplastic resin or a thermoplastic resin elastomer composition, a primary molded body is formed by fitting bead rings on opposite width direction ends of the cylindrical-shaped body, and the primary molded body is sucked on the inner peripheral surface of a transfer and holding mold. After a rigid inner mold is inserted into the body, suction is stopped and the body is transferred to the outer peripheral surface of the inner mold. Then, another tire member is stacked on the outer peripheral surface to mold a green tire. The tire, from which the inner mold was removed, is mounted inside a curing mold which is heated. The film is inflated and heated to vulcanize the tire, and bonded to the inner peripheral tire surface to form an inner layer.

20 Claims, 11 Drawing Sheets

(56) References Cited

U.S. PATENT DOCUMENTS

| | | | |
|---|---|---|---|
| 6,740,280 B1* | 5/2004 | Brown et al. | 264/326 |
| 7,128,545 B2* | 10/2006 | Wang et al. | 425/52 |
| 7,597,837 B2* | 10/2009 | Caretta | 264/501 |
| 7,780,807 B2* | 8/2010 | Stoila | 156/130.7 |
| 7,901,608 B2* | 3/2011 | Takagi et al. | 264/326 |
| 7,959,849 B2* | 6/2011 | Lopez et al. | 264/501 |
| 8,158,050 B2* | 4/2012 | Sano et al. | 264/501 |
| 8,518,317 B2* | 8/2013 | Mancini | 264/315 |
| 2005/0082704 A1* | 4/2005 | Hirose | 264/39 |
| 2006/0169392 A1* | 8/2006 | Akiyama et al. | 156/111 |
| 2009/0131592 A1* | 5/2009 | Sakai et al. | 525/190 |

FOREIGN PATENT DOCUMENTS

| | | |
|---|---|---|
| JP | 2001-315128 A | 11/2001 |
| JP | 2003-245928 A | 9/2003 |
| JP | 2003-340824 A | 12/2003 |
| JP | 2005-219565 A | 8/2005 |
| JP | 2005-297478 A | 10/2005 |
| JP | 2007-030691 A | 2/2007 |
| JP | 2007-050571 A | 3/2007 |
| JP | 2007-098764 A | 4/2007 |
| JP | 2008-044204 A | 2/2008 |
| JP | 2009-018445 A | 1/2009 |
| JP | 2009-029035 A | 2/2009 |
| WO | WO-2004/048075 A1 | 6/2004 |

* cited by examiner

METHOD OF MANUFACTURING PNEUMATIC TIRE

CROSS-REFERENCE TO RELATED APPLICATIONS

This U.S. National stage application claims priority under 35 U.S.C. §119(a) to Japanese Patent Application No. 2009-112877, filed in Japan on May 7, 2009, the entire contents of Japanese Patent Application No. 2009-112877 are hereby incorporated herein by reference.

BACKGROUND

1. Field of the Invention

The present invention relates to a method of manufacturing a pneumatic tire, and more particularly to a method of manufacturing a pneumatic tire, which enables a pneumatic tire having excellent uniformity to be manufactured with high productivity by effectively using a rigid inner mold, the pneumatic tire having an inner layer which is light in weight and excels in air penetration preventing performance.

2. Background Information

Various methods of manufacturing a pneumatic tire, in which a green tire is molded on the outer peripheral surface of a metal rigid inner mold, and the molded green tire is placed inside a curing mold along with the rigid inner mold for curing, have been proposed as described, for example, in Japanese patent application Kokai publication No. 2001-88143 and Japanese patent application Kokai publication No. 2003-340824. The manufacturing method using such a rigid inner mold does not require a conventionally used bladder made of rubber, and can eliminates the process of, for example, detaching the molded green tire from a making drum. Moreover, compared with the case where a bladder is used for manufacturing, there is an advantage in that the inner peripheral surface of the cured tire can be formed into a predetermined shape with high precision.

However, because the green tire is pressed by the curing mold from only the outside during the curing, the pressing force acting on the inner peripheral surface of the green tire is small. Accordingly, for example, even when non-uniformity in the volume of the tire constituting members exists on the inner peripheral surface of the tire, it is difficult to correct the non-uniformity, and thus improvement in uniformity of the cured tire is limited.

In addition, when the inner peripheral surface of the green tire is pressed by the outer peripheral surface of the rigid inner mold, spaces between divided bodies forming the rigid inner mold leave marks on the inner peripheral surface of the cured tire, and thus there is a problem of reduced appearance quality.

Furthermore, although butyl rubber is mainly used for an inner layer (innermost peripheral surface) of the green tire, an additional work of, for example, applying release agent is needed in order to easily release the inner layer from the outer peripheral surface of the rigid inner mold. Using an inner layer formed of butyl rubber is disadvantageous in reducing the tire weight because an inner layer formed of butyl rubber needs a certain thickness to secure sufficient air penetration preventing performance. For this reason, an inner layer which is light in weight and excels in air penetration preventing performance has been demanded.

Furthermore, in the conventional manufacturing method using a rigid inner mold, the rigid inner mold is placed inside the curing mold along with the green tire during the curing, and thus there is a problem in that the rigid inner mold cannot be used for molding the green tire during the curing.

Consequently, for example, in order to increase the production volume of tires, an accordingly large number of rigid inner molds are needed.

SUMMARY

An object of the present invention is to provide a method of manufacturing a pneumatic tire, which enables a pneumatic tire having excellent uniformity to be manufactured with high productivity by effectively using a rigid inner mold, the pneumatic tire having an inner layer which is light in weight and excels in air penetration preventing performance.

A method of manufacturing a pneumatic tire according to the present invention to achieve the above-described object is characterized in that a primary molded body is formed by fitting bead rings on opposite ends, in a width direction, of a cylindrical-shaped body in which at least a carcass material is mounted on an outer peripheral side of a film formed of a thermoplastic resin or a thermoplastic elastomer composition obtained by blending a thermoplastic resin with an elastomer; the primary molded body is set to be sucked and held to an inner peripheral surface of a transfer and holding mold; a cylindrical-shaped rigid inner mold including multiple divided bodies is inserted inside the primary molded body, thereafter suction by the transfer and holding mold is stopped, and the primary molded body is transferred to an outer peripheral surface of the rigid inner mold; next, opposite ends of the carcass material in a width direction thereof are turned up on the rigid inner mold, while other tire constituting members are stacked on an outer peripheral surface of the primary molded body so that a green tire is molded; the rigid inner mold is detached from the green tire, thereafter the green tire is disposed inside a curing mold installed in a curing apparatus, and the curing mold is heated to a predetermined temperature; and the film is pressurized from an inner peripheral side to be inflated while being heated to cure the green tire, and the film is brought into close contact with and bonded to an inner peripheral surface of the tire.

Here, in order that the film is pressurized from an inner peripheral side to be inflated while being heated, for example, a bladder which, when being expanded, has a same shape as an inner peripheral hollow portion of the green tire is expanded by heated fluid in the inner peripheral hollow portion of the green tire disposed inside the curing mold. Alternatively, the film is pressurized to be inflated while being heated by injecting heated fluid directly into an inner peripheral surface of the green tire disposed inside the curing mold. In addition, in the present invention, when the primary molded body is sucked and held to the inner peripheral surface of the transfer and holding mold, it is also possible that the transfer and holding mold is disposed at an outer peripheral side of the primary molded body, and the primary molded body is pressurized from an inner peripheral side of the primary molded body, while the primary molded body is sucked by the transfer and holding mold from an outer peripheral side of the primary molded body.

When the green tire is cured, the film is pressurized to be inflated from an inner peripheral side with a pressure of 0.01 MPa to 3.0 MPa. Moreover, for example, air is sucked from an inside of the curing mold to an outside, while a green tire disposed inside the curing mold is cured.

According to a method of manufacturing a pneumatic tire of the present invention, a primary molded body is, formed by fitting bead rings on opposite ends, in the width direction, of a cylindrical-shaped body in which at least a carcass material is mounted on the outer peripheral side of a film formed of a thermoplastic resin or a thermoplastic elastomer composition; the primary molded body is set to be sucked and held to the inner peripheral surface of a transfer and holding mold; cylindrical-shaped rigid inner mold including multiple divided bodies is inserted inside the primary molded body; thereafter, suction by the transfer and holding mold is stopped; whereby the primary molded body can be smoothly transferred to the outer peripheral surface of the rigid inner mold without damaging the film on the inner peripheral surface.

Next, the opposite ends of the above-mentioned carcass material in the width direction thereof are turned up on the rigid inner mold, while other tire constituting members are stacked on the outer peripheral surface of the primary molded body so that the green tire is molded; the rigid inner mold is detached from the green tire, and then the green tire is disposed inside a curing mold installed in a curing apparatus and is cured; thus the rigid inner mold can be freely used during the curing. Accordingly, the number of green tires that can be molded by one rigid inner mold within a predetermined time period increases, and thus productivity can be improved by effectively using the rigid inner mold.

The green tire disposed inside the curing mold is cured after the curing mold is heated to a predetermined temperature, and the film is pressurized from the inner peripheral side to be inflated while being heated, and thus unvulcanized rubber of the tire constituting members is pressed against the inner peripheral surface of the curing mold and flows in the circumferential direction, whereby even when non-uniformity in the volume of the tire constituting members exists, the non-uniformity can be corrected. Accordingly, uniformity of the tires to be manufactured can be improved.

Moreover, the green tire is cured, while the film is brought into close contact with and bonded to the inner peripheral surface of the tire to form an inner layer. This film is formed with a thermoplastic resin or a thermoplastic elastomer composition. For this reason, compared with the conventional inner layer which is formed of butyl rubber, the film is light in weight and has good gas barrier property, and thus manufactured tires are light in weight and have excellent air penetration preventing performance.

DETAILED DESCRIPTION OF EMBODIMENTS

Hereinafter, a method of manufacturing a pneumatic tire according to the present invention is described based on the embodiments shown in the drawings. The same reference numerals are used for the same members before and after curing.

Figure 19:
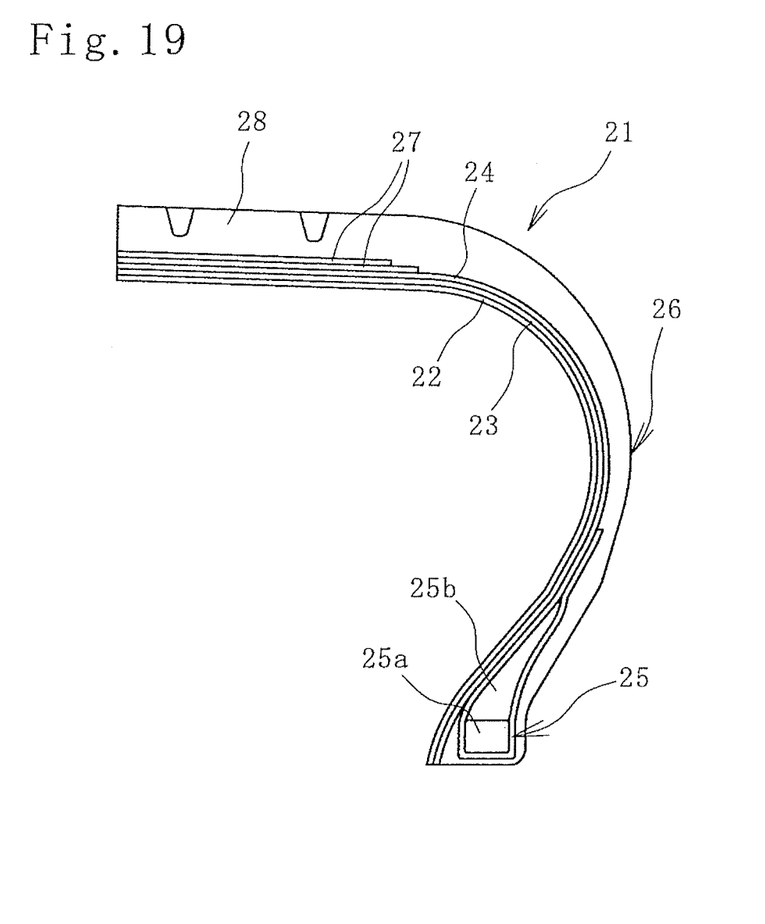
FIG. 19 is a meridian half cross sectional view illustrating a pneumatic tire manufactured by a disclosed embodiment.

FIG. 19 illustrates a pneumatic tire 21 manufactured by the present invention. In the pneumatic tire 21, a carcass material 24 is laid between a pair of bead rings 25, and the carcass material 24 is folded back around a bead core 25a from the inner side to the outer side. A tie rubber 23 and a film 22 are stacked on the inner peripheral side of the carcass material 24. The film 22 on the innermost side is an inner layer which prevents air penetration, and the film 22 and the carcass material 24 are bonded securely by the tie rubber 23 interposed therebetween. A rubber member forming a sidewall portion 26, and a rubber member forming a tread portion 28 are provided on the outer peripheral side of the carcass material 24.

A belt layer 27 is provided over the entire periphery in the tire circumferential direction on the outer peripheral side of the carcass material 24 of the tread portion 28. A reinforcing cord forming the belt layer 27 is disposed so as to be inclined to the tire circumferential direction, and stacked upper and lower belt layers 27 are disposed so that reinforcing cords thereof cross each other. A pneumatic tire 1 manufactured by the present invention is not limited to the structure shown in FIG. 19, and the present invention is applicable to the manufacture of a pneumatic tire with a different structure.

The pneumatic tire 11 has a major structural feature in that the inner layer is formed of the film 22 in place of a conventional butyl rubber. The thickness of the film 22 is, for example, 0.005 mm to 0.2 mm.

The film 22 used in the present invention includes a thermoplastic resin or a thermoplastic elastomer composition obtained by blending a thermoplastic resin with an elastomer.

Examples of the thermoplastic resin include: polyamide-based resins [for example, nylon 6 (N6), nylon 66 (N66), nylon 46 (N46), nylon 11 (N11), nylon 12 (N12), nylon 610 (N610), nylon 612 (N612), nylon 6/66 copolymers (N6/66), nylon Jun. 66, 19610 copolymers (N6/66/610), nylon MXD6, nylon 6T, nylon 6/6T copolymers, nylon 66/PP copolymers, and nylon 66/PPS copolymers]; polyester-based resins [for example, aromatic polyesters such as polybutylene terephthalate (PBT), polyethylene terephthalate (PET), polyethylene isophthalate (PEI), polybutylene terephthalate/tetramethylene glycol copolymer, PET/PEI copolymers, polyarylate (PAR), polybutylene naphthalate (PBN), liquid crystal polyester, and polyoxyalkylene diimide diacid/polybutylene terephthalate copolymers]; polynitrile-based resins [for example, polyacrylonitrile (PAN), polymethacrylonitrile, acrylonitrile/styrene copolymers (AS), methacrylonitrile/styrene copolymers, and methacrylonitrile/styrene/butadiene copolymer]; poly(meth)acrylate-based resin, [for example, poly methyl methacrylate (PMMA), polymethylmethacrylate, ethylene ethyl acrylate copolymer (EEA), ethylene acrylic acid copolymer (EAA), and ethylene methyl acrylate resin (EMA)]; polyvinyl-based resins [for example, vinyl acetate (EVA), polyvinyl alcohol (PVA), vinyl alcohol/ethylene copolymers (EVOH), polyvinylidene chloride (PVDC), polyvinyl chloride (PVC), vinyl chloride/vinylidene chloride copolymers, and vinylidene chloride/methyl acrylate copolymers]; cellulose-based resins [for example, cellulose acetate, and cellulose acetate butyrate]; fluororesins [for example, polyvinylidene fluoride (PVDF), polyvinyl fluoride (PVF), polychlorotrifluoroethylene (PCTFE), and tetrafluoroethylene/ethylene copolymers (ETFE)]; imide-based resins [for example, aromatic polyimide (PI)].

Examples of the elastomer include: diene rubbers and their hydrogenated products [for example, NR, IR, epoxidized natural rubbers, SBR, BR (high-cis BR and low-cis BR), NBR, hydrogenated NBR, and hydrogenated SBR]; olefin-based rubbers [for example, ethylene propylene rubbers (EPDM and EPM), and maleic acid-modified ethylene propylene rubber (M-EPM); butyl rubber (IIR); copolymers of isoprene and aromatic vinyl or diene monomer; acrylic rubber (ACM); ionomers; halogen-containing rubbers [for example, Br—IIR, CI—IIR, brominated isobutylene paramethylstyrene copolymers (Br—IPMS), chloroprene rubber (CR), hydrin rubber (CHC and CHR), chlorosulfonated polyethylene (CSM), chlorinated polyethylene (CM), and maleic acid-modified chlorinated polyethylene (M-CM)]; silicone rubbers [for example, methyl vinyl silicone rubber, dimethyl silicone rubber, and methylphenylvinyl silicone rubber]; sulfur-containing rubbers [for example, polysulfide rubber]; fluororubbers [for example, vinylidene fluoride-based rubbers, fluorine-containing vinyl ether-based rubbers, tetrafluoroethylene propylene-based rubbers, fluorine-containing silicone-based rubbers, and fluorine-containing phosphazene-based rubbers]; thermoplastic elastomers [for example, styrene-based elastomers, olefin-based elastomers, polyester-based elastomers, urethane-based elastomers, and polyamide-based elastomers].

In the thermoplastic elastomer composition used in the present invention, the weight ratio between a thermoplastic resin component (A) and an elastomer component (B) is determined as appropriate by the balance of the thickness and the flexibility of the film. For example, the weight ratio of the thermoplastic resin component (A) to the total weight of the thermoplastic resin component (A) and the elastomer component (B) is preferably 10% to 90%, and more preferably 20% to 85%.

A compounding agent and other polymers such as a compatibilizer can be mixed to the thermoplastic elastomer composition used in the present invention as a third component in addition to the above-mentioned essential components (A) and (B). The purposes of mixing other polymers include: improvement of the compatibility between the thermoplastic resin component and the elastomer component, improvement of processability and formability of material into a film, improvement of heat resistance, and cost reduction. Examples of the materials used for these purposes include polyethylene, polypropylene, polystyrene, ABS, SBS, and polycarbonate.

The film 22 formed of the above-mentioned thermoplastic resin or the thermoplastic elastomer composition has excellent gas barrier property because it excels in the surface orientation of high-polymer chains. As shown above, in the pneumatic tire 21 manufactured by the present invention, the film 22 which has better gas barrier property than butyl rubber serves as the inner layer. Accordingly, compared with the conventional pneumatic tire, excellent air penetration preventing performance can be obtained.

Furthermore, the thickness of the inner layer formed of the conventional butyl rubber is, for example, 0.5 mm to 5.0 mm, but the thickness of the film 22 is 0.005 mm to 0.2 mm. Thus, the weight of the inner layer can be significantly reduced, and this reduction greatly contributes to reduction of the weight of the pneumatic tire 21.

The process of manufacturing the pneumatic tire 21 is described below.

Figure 1:
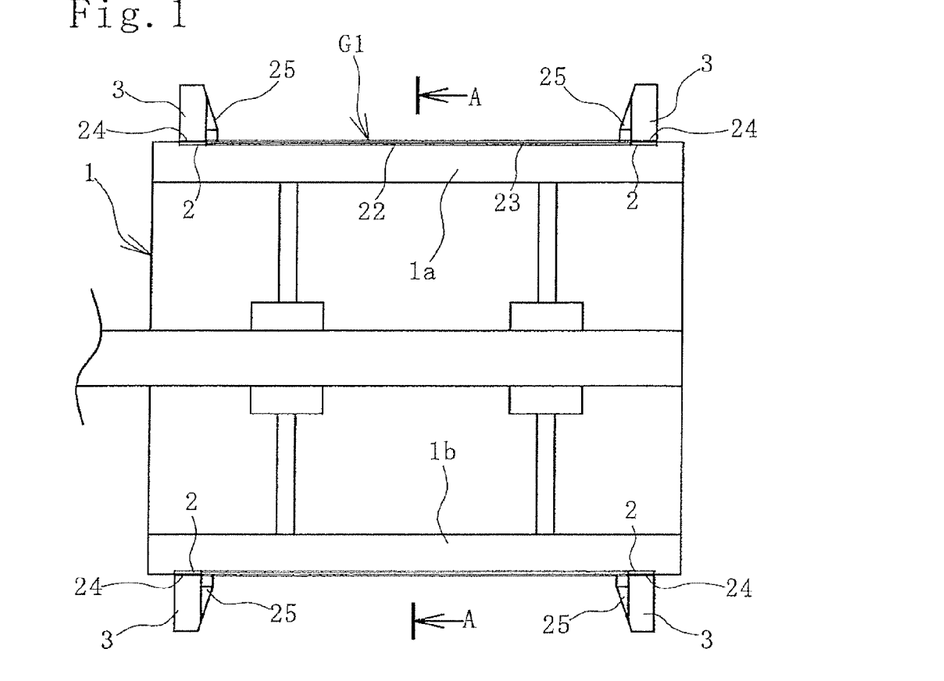
FIG. 1 is a vertical sectional view illustrating the process of molding a primary molded body.
Figure 2:
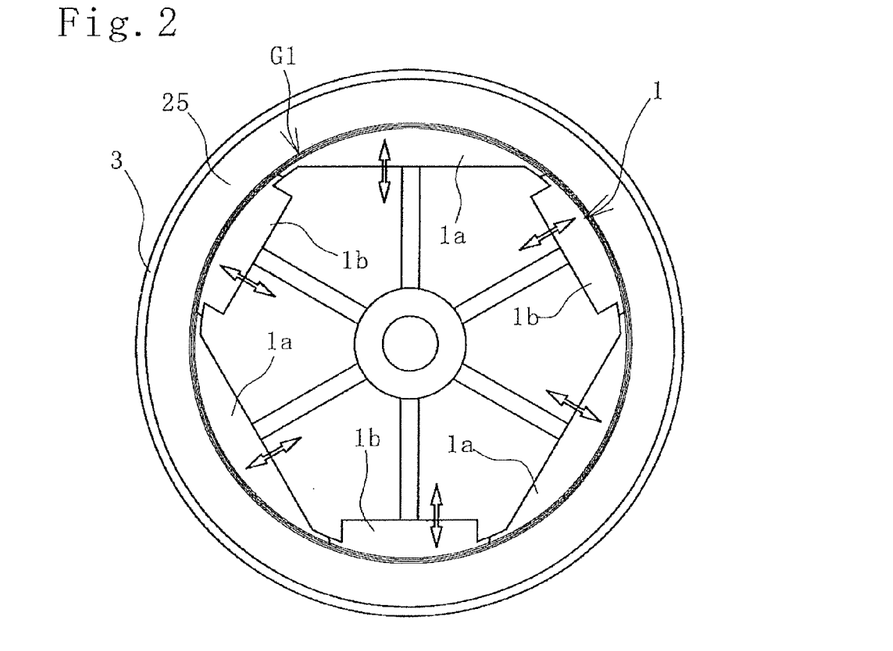
FIG. 2 is a cross-sectional view taken along A-A in FIG. 1.

First, a primary molded body G1 is molded using a primary making drum 1 illustrated in FIGS. 1 and 2. The primary making drum 1 is formed of multiple segments 1*a*, 1*b* which are divided in the circumferential direction, and two types of segments 1*a*, 1*b* are each movable in the radial direction. Accordingly, the primary making drum 1 is a cylindrical body which is expandable and contractible. The number of the segments 1*a*, 1*b* is 6 in this embodiment, but it is not limited to 6.

Fixing rings 2 are fitted on opposite ends, in the width direction, of the primary making drum 1, and each segment 1*a* is moved in a radially-outward direction to make the primary making drum 1 into a cylindrical shape. The film 22, the tie rubber 23, and the carcass material 24 are placed so as to be stacked in this order on the outer peripheral surface of the primary making drum 1 which is made into a cylindrical shape, whereby a cylindrical-shaped body is formed. The carcass material 24 projects out from the film 22 and the tie rubber 23 at both sides in the width direction.

In the case where the film 22 preformed in a tubular shape is used, the tubular film 22 is fitted on the primary making drum 1 to form a cylindrical-shaped body. In the case where strip-shaped film 22 is used, the strip-shaped film 22 is wrapped around the outer peripheral surface of the primary making drum 1 to form a cylindrical-shaped body. In the latter case, the strip-shaped film 22 and the tie rubber 23, or the strip-shaped film 22, the tie rubber 23, and the carcass material 24 are pre-stacked to form a stacked body, then the stacked body can be wrapped around the outer peripheral surface of the primary making drum 1 to form a cylindrical-shaped body.

Next, the bead rings 25 are disposed on the opposite ends of the carcass material 24 in the width direction thereof on the outer peripheral side. Then, the carcass fixing rings 3 are disposed on the opposite ends of the carcass material 24 in the width direction thereof on the outer peripheral side. Thus, the opposite ends of the carcass material 24 in the width direction thereof are fixed by being sandwiched between the fixing rings 2 and the carcass fixing rings 3. The bead rings 25 are fixed on the inner sides of the carcass fixing rings 3. In this manner, the primary molded body G1 is molded by fitting the bead rings 25 on the opposite ends, in the width direction, of a cylindrical-shaped body in which at least the carcass material 24 is mounted on the outer peripheral side of the film 22.

Figure 3:
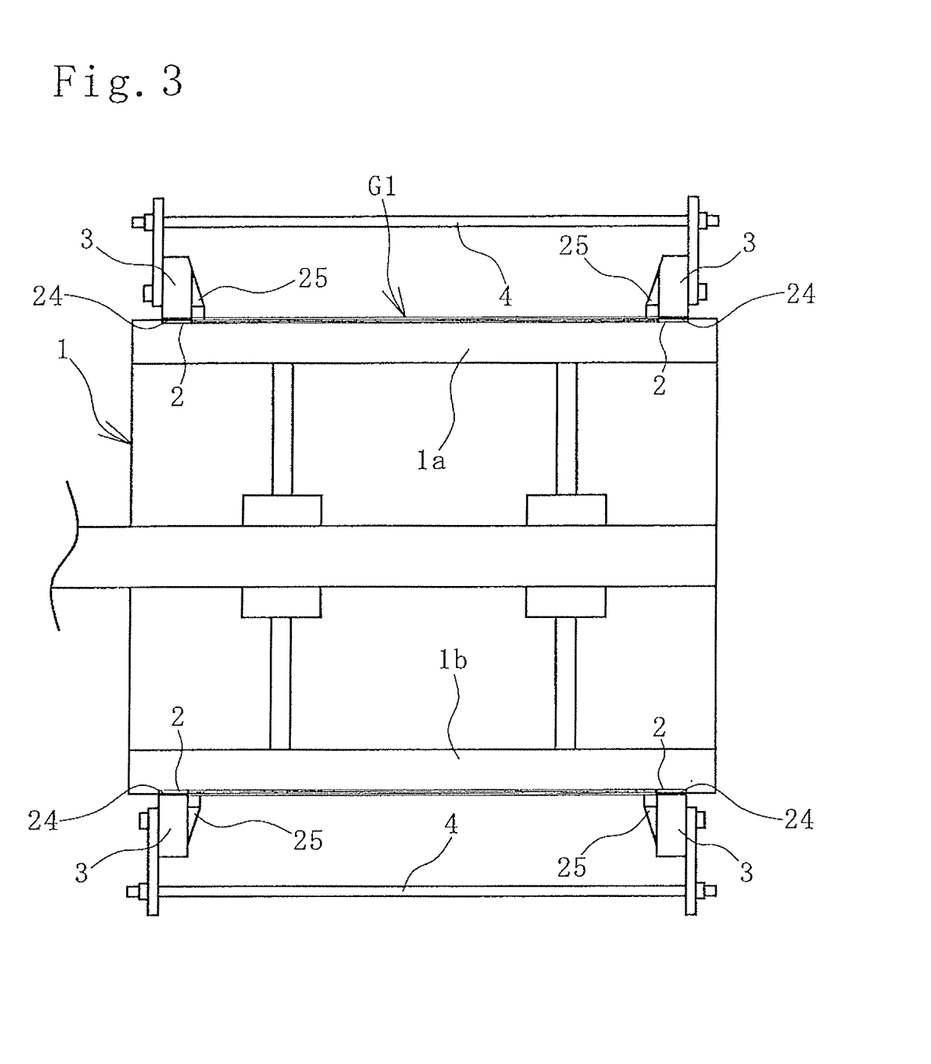
FIG. 3 is a vertical sectional view illustrating the state where a space adjusting plate is connected to carcass fixing rings in FIG. 1.

Next, both carcass fixing rings 3 are coupled with each other via a space adjusting plate 4 as illustrated in FIG. 3. The space adjusting plate 4 is attached to the carcass fixing rings 3 using a fixing member such as a bolt.

Next, the segments 1a, 1b are moved in a radially-inward direction, and the primary making drum 1 is removed from the cylindrical-shaped primary molded body G1. Accordingly, the primary molded body G1 is in a state to be held by the fixing rings 2, the carcass fixing rings 3, and the space adjusting plate 4.

Figure 4:
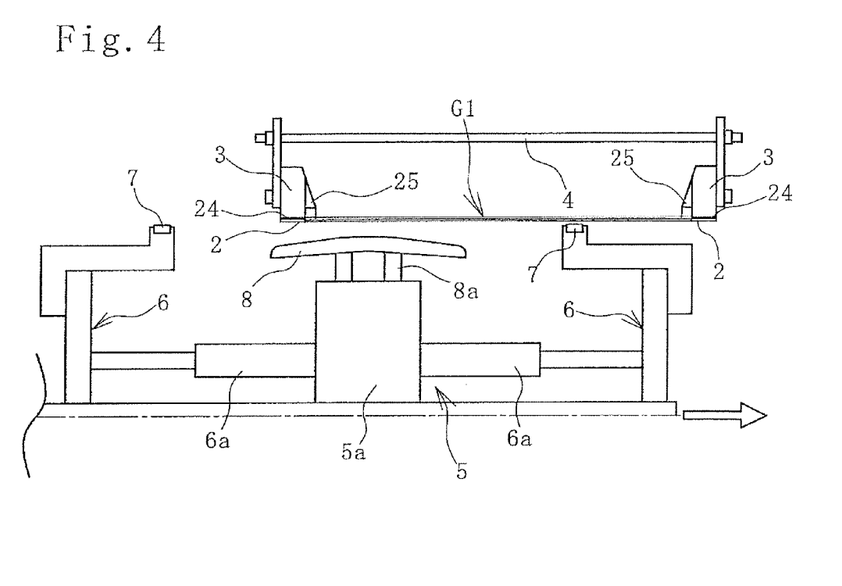
FIG. 4 is an upper half vertical sectional view illustrating the state of inserting an inflation mold into the primary molded body.
Figure 6:
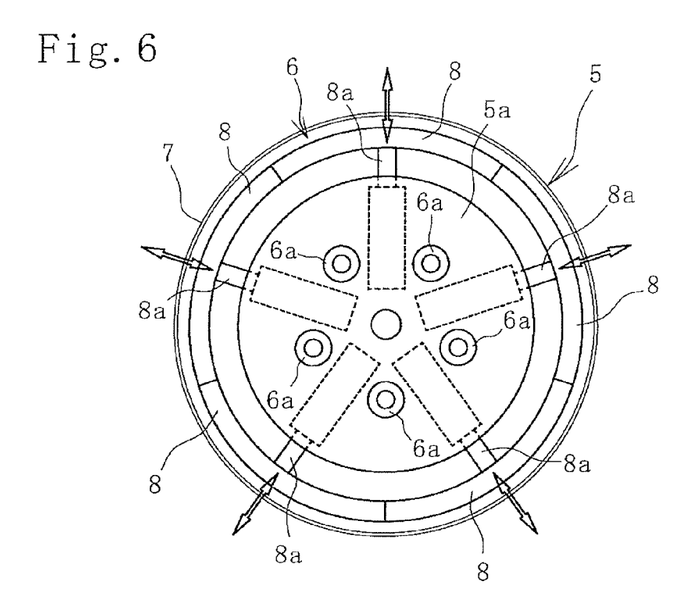
FIG. 6 is a vertical sectional view illustrating the internal structure of the inflation mold in FIG. 4.

Next, a cylindrical-shaped inflation mold 5 is inserted inside the primary molded body G1 as illustrated in FIG. 4. As illustrated in FIGS. 4 and 6, the inflation mold 5 has disc-shaped side plates 6 on both sides of a core portion 5a in the width direction thereof, while the core portion 5a is provided with multiple pressing plates 8 divided in the circumferential direction. Although the number of the pressing plates 8 is 5 in this embodiment, but it is not limited to 5.

The side plates 6 are moved in the width direction by cylinders 6a provided in the core portion 5a. Expandable and contractible sealing members 7 are provided in the outer peripheral edge portions of the side plates 6.

Each pressing plate 8 is configured to be moved in the radial direction by a cylinder 8a provided in the core portion 5a. The outer peripheral surface of the pressing plate 8 has approximately the same shape as the profile of the inner peripheral surface of the tire to be manufactured.

After the inflation mold 5 is inserted inside the primary molded body G1, the sealing members 7 are expanded so that the peripheral portions (the fixing rings 2 and the carcass fixing rings 3) of the bead rings 25 are securely fixed by the side plates 6. Subsequently, the space adjusting plate 4 is detached from the carcass fixing rings 3.

Figure 5:
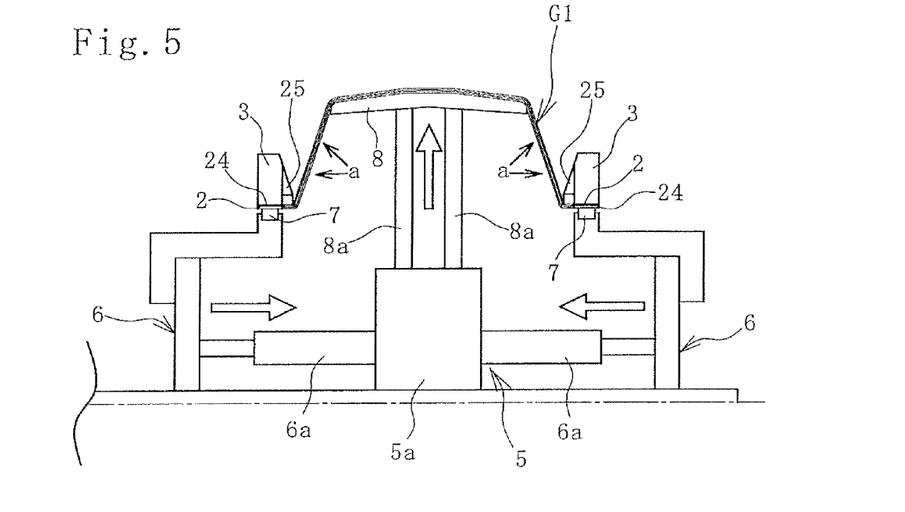
FIG. 5 is an upper half vertical sectional view illustrating the state of expanding and deforming the primary molded body toward the outer peripheral side.

Next, as illustrated in FIG. 5, each cylinder 6a is set free, and the rod of each cylinder 8a is extended to press the pressing plate 8 against the inner peripheral surface of the primary molded body G1, while slightly pressurizing the primary molded body G1 by injecting air a from the inner peripheral side so that the primary molded body G1 is expanded and deformed to the outer peripheral side. At this point, both bead rings 25 (the side plates 6) are moved so as to be closer to each other.

Figure 7:
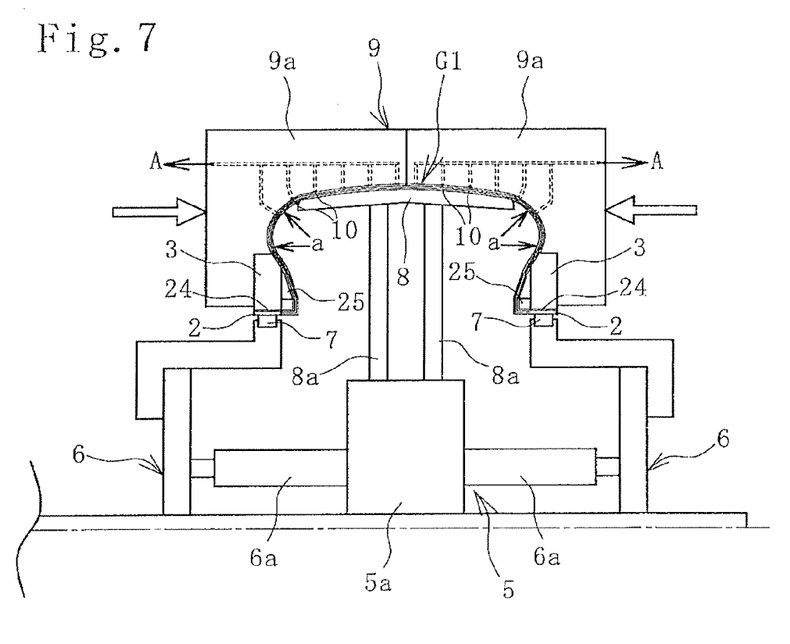
FIG. 7 is an upper half vertical sectional view illustrating the process of sucking and holding the primary molded body by a transfer and holding mold.

Next, as illustrated in FIG. 7, a transfer and holding mold 9 is disposed on the outer peripheral side of the primary molded body G1. Suction means such as a vacuum pump is detachably connected to the transfer and holding mold 9. The transfer and holding mold 9 is formed with divided molds 9a which are divided in half in the width direction. The inner peripheral surface of the transfer and holding mold 9 is formed in an annular shape, and a large number of suction holes 10 communicating with the suction means are formed.

Next, the air a is further injected from the inner peripheral side of the primary molded body G1 to pressurize the primary molded body G1, while air A is sucked through the suction holes 10 of the transfer and holding mold 9 with the divided molds 9a assembled, so that the primary molded body G1 is sucked from the outer peripheral side. Thereby, the primary molded body G1 is in a state to be sucked and held to the inner peripheral surface of the transfer and holding mold 9. Subsequently, the rods of cylinders 8a are contracted to retreat the pressing plate 8 and the sealing members 7 are contracted, whereby the inflation mold 5 is removed from the primary molded body G1. Suction of the primary molded body G1 by the transfer and holding mold is continued until the primary molded body G1 is transferred to a rigid inner mold 11.

Figure 8:
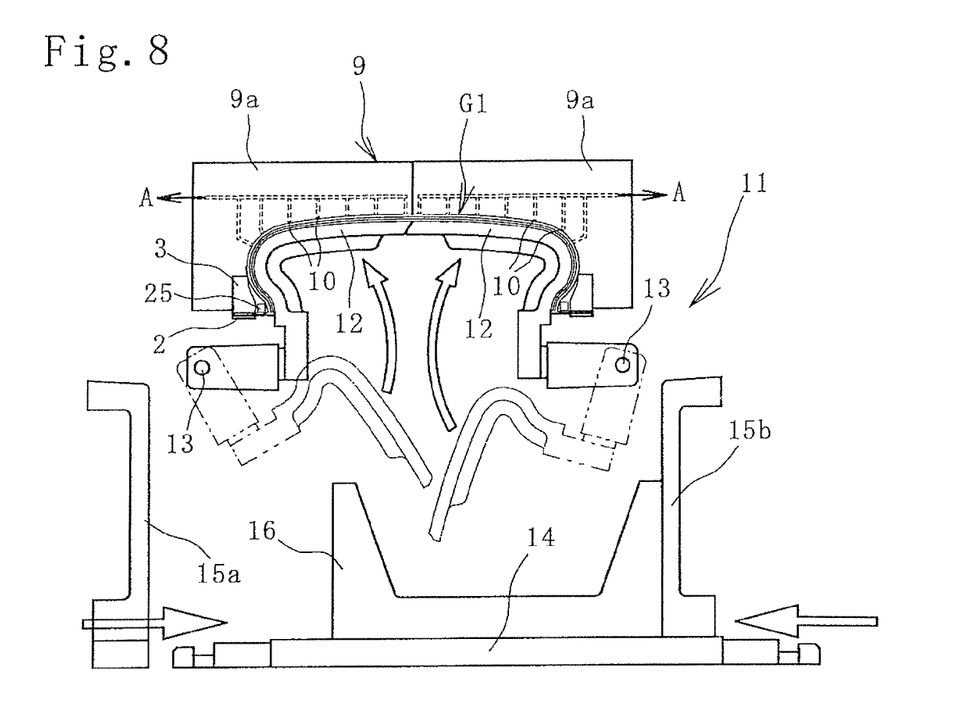
FIG. 8 is an upper half vertical sectional view illustrating the process of inserting a rigid inner mold into the primary molded body.

Next, as illustrated in FIG. 8, the cylindrical-shaped rigid inner mold 11 is inserted inside the primary molded body.

Detailed structure of the rigid inner mold 11 is described later. Multiple divided bodies 12 divided in the circumferential direction are further divided in the width direction. Out of the resultant divided bodies 12, those on one side in the width direction are first moved around a rotation mechanism 13 as the rotation center in a radially-outward direction. Then, the divided bodies 12 on the other side are similarly moved and attached to the primary molded body G1 in an annular shape. With such attachment operation, the rigid inner mold 11 is inserted inside the primary molded body G1.

Subsequently, suction by the transfer and holding mold 9 is stopped, and the primary molded body G1 is transferred to the outer peripheral surface of the rigid inner mold 11. After the primary molded body G1 is transferred, the transfer and holding mold 9 is separated into divided molds 9a, and detached from the primary molded body G1.

In this way, according to the present invention, the primary molded body G1 is set to be sucked and held to the inner peripheral surface of the transfer and holding mold 9, then is transferred to the outer peripheral surface of the rigid inner mold 11, and thus transfer operation can be performed smoothly without damaging the film 22 which serves as the inner layer.

Figure 9:
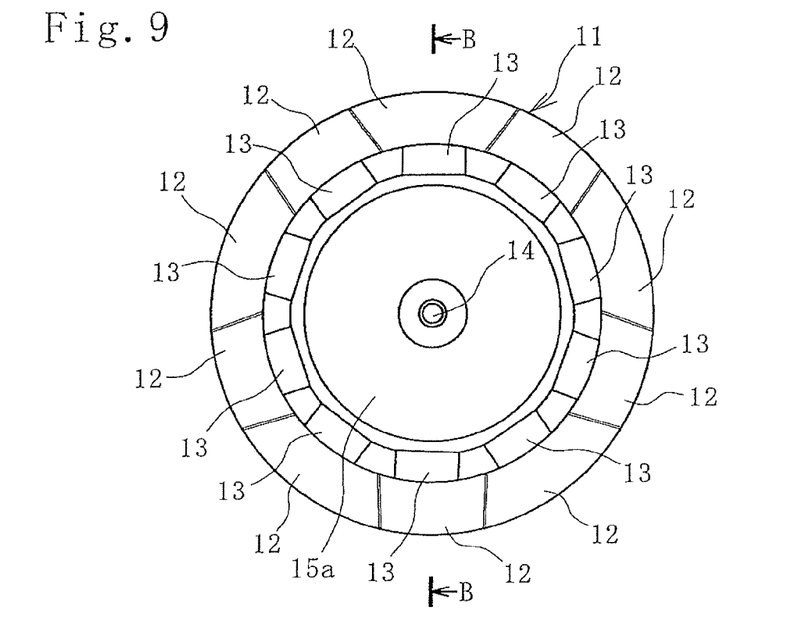
FIG. 9 is a front view of the rigid inner mold.
Figure 10:
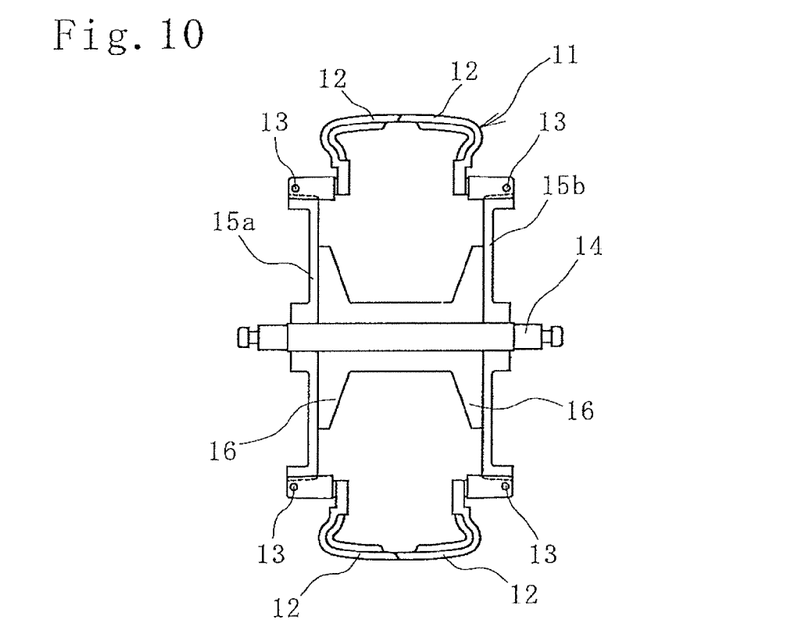
FIG. 10 is a cross-sectional view taken along B-B in FIG. 9.

The rigid inner mold 11 is in a cylindrical shape as illustrated in FIGS. 9 and 10, and includes the divided bodies 12 plurally divided in the circumferential direction. The divided bodies 12 are further divided in half in the width direction of the cylindrical-shaped peripheral surface. Examples of the material of the rigid inner mold 11 include metal such as aluminum and an aluminum alloy.

These divided bodies 12 are fixed to peripheral edge portions of opposed disc-shaped supporting plates 15a, 15b via the rotation mechanisms 13, and are formed in a cylindrical shape. That is to say, out of the divided bodies 12 divided in half in the width direction of the cylindrical-shaped peripheral surface, those on one side in the width direction are disposed in an annular shape along the peripheral edge portion of the supporting plate 15a on one side out of the opposed supporting plates 15a, 15b, and out of the divided bodies 12 divided in half in the width direction of the cylindrical-shaped peripheral surface, those on the other side in the width direction are disposed in an annular shape along the peripheral edge portion of the supporting plate 15b on the other side.

A central shaft 14 is fixed at the circle center position of the opposed supporting plates 15a, 15b to pass therethrough. The central shaft 14 and a pair of the supporting plates 15a, 15b are fixed to each other via a supporting rib 16 fixed on the outer peripheral surface of the central shaft 14. As described later, the rigid inner mold 11 including the multiple divided bodies 12 formed in a cylindrical shape is moved so that each divided body 12 is rotated in a diameter expanding or reducing direction around the rotation mechanism 13 as the rotation center.

Figure 11:
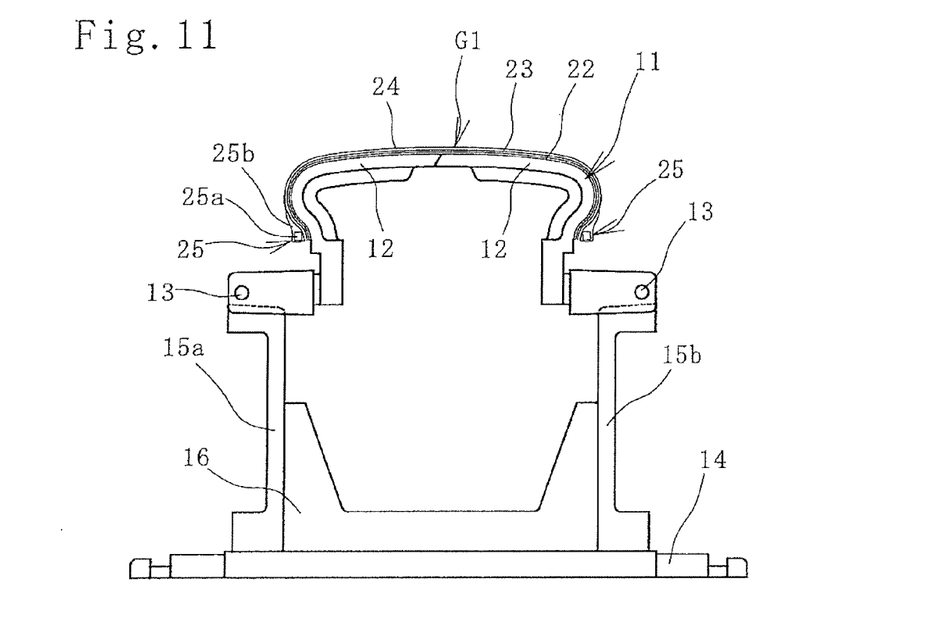
FIG. 11 is an upper half vertical sectional view illustrating the rigid inner mold to which the primary molded body is transferred.

Next, as illustrated in FIG. 11, the cylindrical-shaped rigid inner mold 11, to which the primary molded body G1 is transferred, is mounted on a molding apparatus and the like with the central shaft 14 being supported in order to mold the green tire G.

Figure 12:
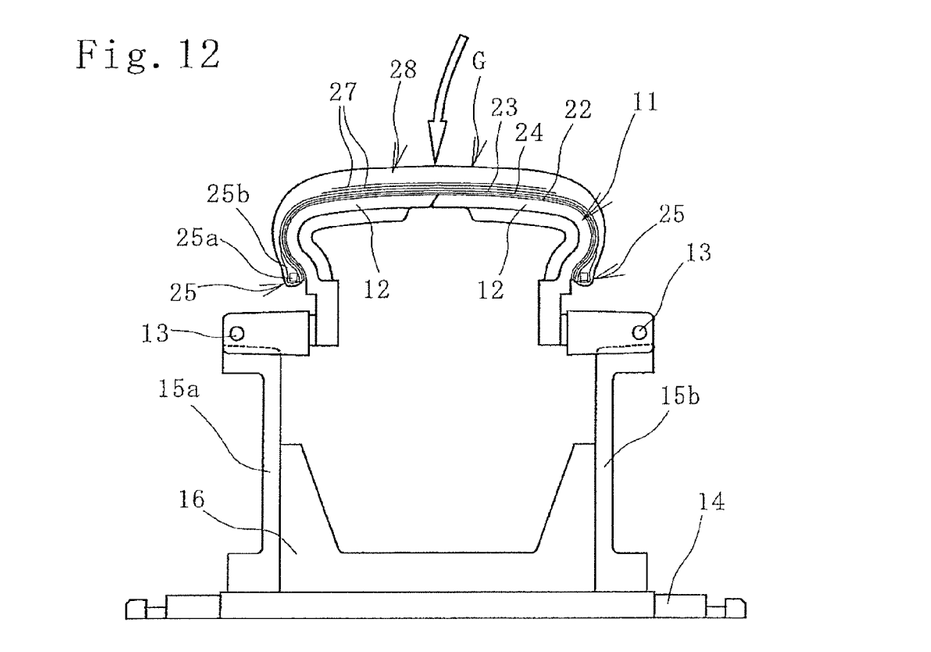
FIG. 12 is an upper half vertical sectional view illustrating the state where a green tire is molded to the outer peripheral surface of the rigid inner mold.

The opposite ends of the carcass material 24 in the width direction thereof are turned up on the rigid inner mold 11, while other tire constituting members such as the rubber member of the sidewall portion 26, the belt layers 27, the rubber member of the tread portion 28 are stacked on the outer peripheral surface of the primary molded body G1 so that the green tire G is molded as illustrated in FIG. 12. The green tire G has no tread patterns formed thereon, but is formed in approximately the same size and shape as the pneumatic tire 21 to be manufactured.

Figure 13:
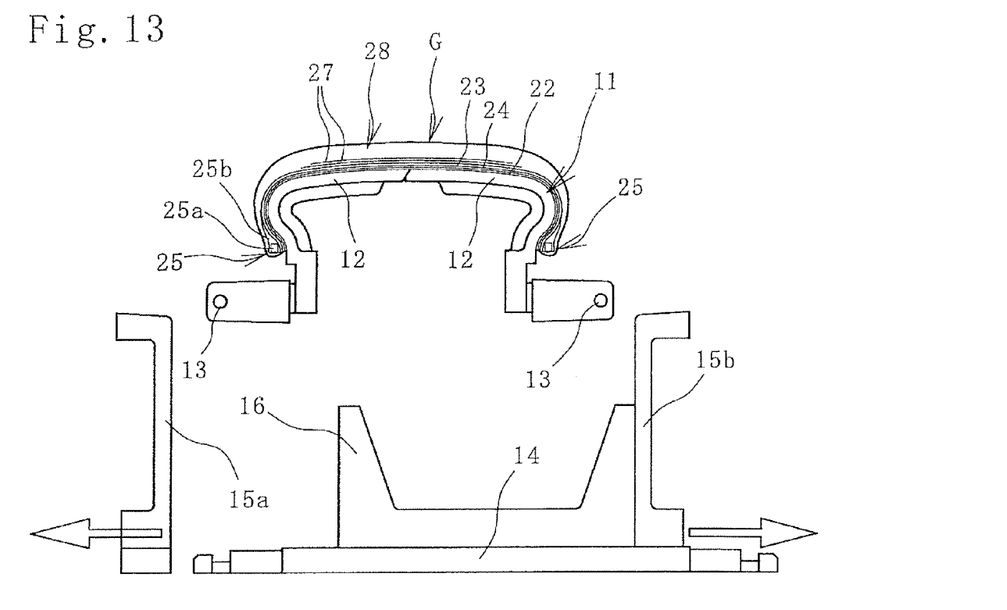
FIG. 13 is an upper half vertical sectional view illustrating the process of detaching the rigid inner mold from the molded green tire.

Next, the rigid inner mold 11 is detached from the molded green tire G. In order to detach the rigid inner mold 11, first, as illustrated in FIG. 13, the rotation mechanisms 13 of the divided bodies 12 are held from both sides in the width direction of the rigid inner mold 11, and engagement between the rotation mechanisms 13 and the supporting plates 15a, 15b is released. In this state, one supporting plate 15a is removed from the central shaft 14, then the supporting plate 15a and the other supporting plate 15b with fixed central shaft 14 are moved to the outside of the green tire G.

Figure 14:
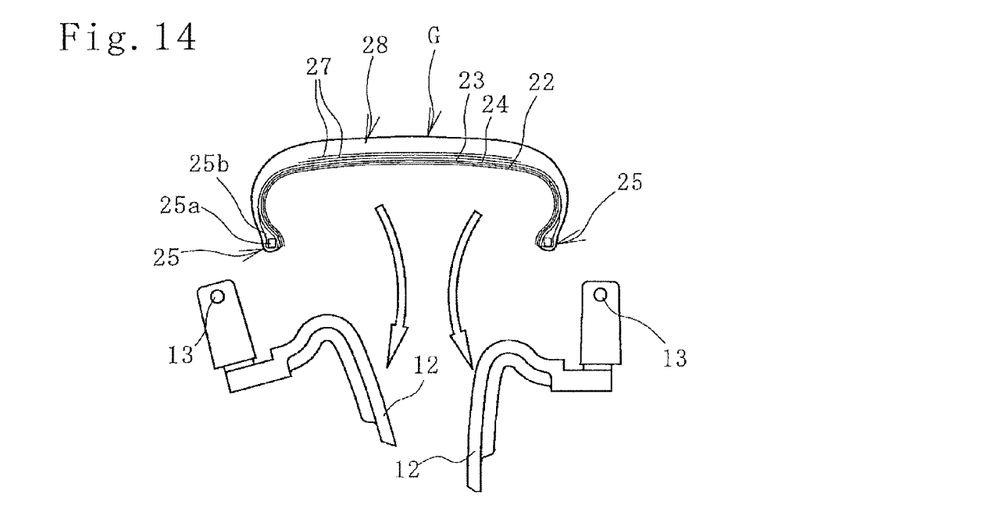
FIG. 14 shows an upper half vertical sectional view illustrating the next process in FIG. 13.

Next, as illustrated in FIG. 14, the divided bodies 12 on one side in the width direction (right side in FIG. 14) are rotated around the rotation mechanism 13 as the center toward the inside of the tire so that the cylindrical-shaped rigid inner mold 11 reduces its diameter. Subsequently, the divided bodies 12 on the other side in the width direction (left side in FIG. 14), are rotated around the rotation mechanism 13 as the center toward the inside of the tire so that the cylindrical-shaped rigid inner mold 11 reduces its diameter. In this manner, the divided bodies 12 are rotated toward the inside of the tire, then are moved to the outside of the green tire G to be detached. In order to insert the rigid inner mold 11 inside the green tire G, the reverse process of the process illustrated in FIGS. 13 and 14 may be performed.

The film 22 tends to be separated from the divided body 12. For this reason, compared with a pneumatic tire whose inner layer is formed of butyl rubber, the rigid inner mold 11 can be detached smoothly. Due to excellent release characteristics of the film 22, an additional work of, for example, applying release agent between the inner peripheral surface of the green tire and the rigid inner mold 11 (the divided bodies 12) is not required, which is advantageous to the improvement of productivity.

Figure 15:
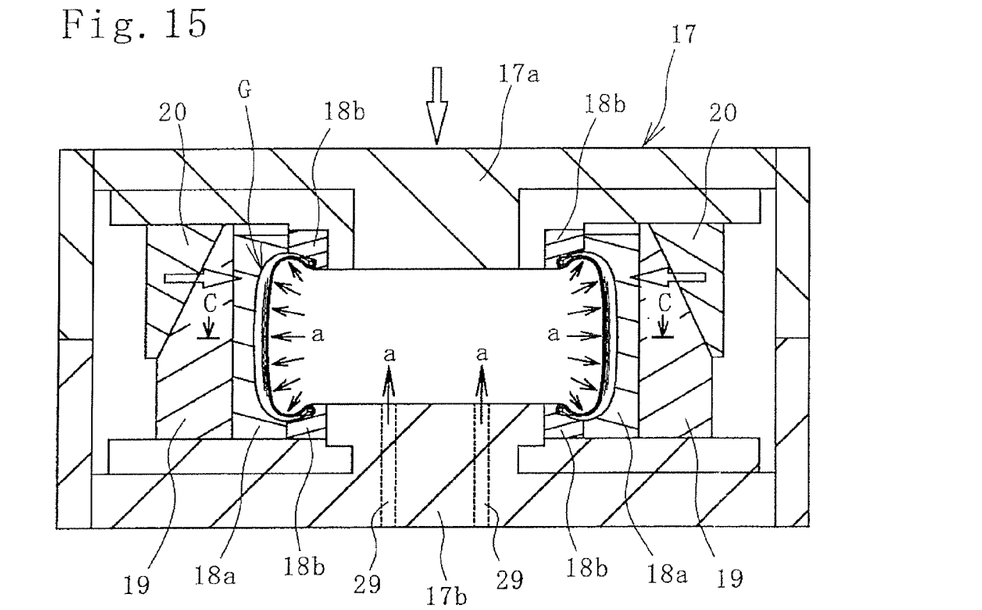
FIG. 15 is a vertical sectional view illustrating the state of curing the green tire.

Next, as illustrated in FIG. 15, molded green tire G is disposed at a predetermined position inside a curing mold installed in a curing apparatus 17. The curing mold includes multiple sectors 18a which are divided in the tire circumferential direction, and upper and lower annular side plates 18b, 18b.

The lower side plate 18b is fixed in a bottom housing 17b in which each sector 18a is placed. A back segment 19 having an inclined surface is mounted on the rear surface of the sector 18a. A guide member 20 having an inclined surface and the upper side plate 18b are fixed in a top housing 17a.

The bead portion below the green tire G is placed on the lower side plate 18b, and after the green tire G is positioned at a predetermined position, the top housing 17a is moved downward. Along with this downward movement, the guide member 20 moves downward, and the inclined surface of the guide member 20 comes in contact with the inclined surface of the back segment 19. As the guide member 20 moves downward, the sector 18a along with the back segment 19 gradually moves toward the central shaft 14. That is to say, the sectors 18a in a state of expanded diameter are moved in a radially-inward direction and are assembled to form an annular shape. Then the upper side plate 18b, which is moved downward, is disposed at the upper inner peripheral edge portions of the sectors 18a assembled in an annular shape. The bead portion on the upper side of the green tire G comes in contact with the upper side plate 18b.

The upper and lower bead portions of the green tire G are brought into close contact with and sealed to the upper and lower side plates 18b, respectively. Accordingly, the inner peripheral hollow portion of the green tire G is surrounded and sealed by the curing mold, the top housing 17a, and the bottom housing 17b.

Next, the curing mold is heated to a predetermined temperature, and heated fluid such as the heated air a is injected into the inner peripheral hollow portion of the green tire G through a communication path 29 provided in the bottom housing 17b. By injecting heated fluid directly into the inner peripheral surface of the film 22 (inner peripheral hollow portion) in this manner, the film 22 is pressurized to be inflated while being heated to cure the green tire G.

Examples of the air a to be supplied include gas such as general air and nitrogen gas. Moreover, the pressure for inflating the film 22 is, for example, approximately 0.01 MPa to 3.0 MPa.

Figure 16:
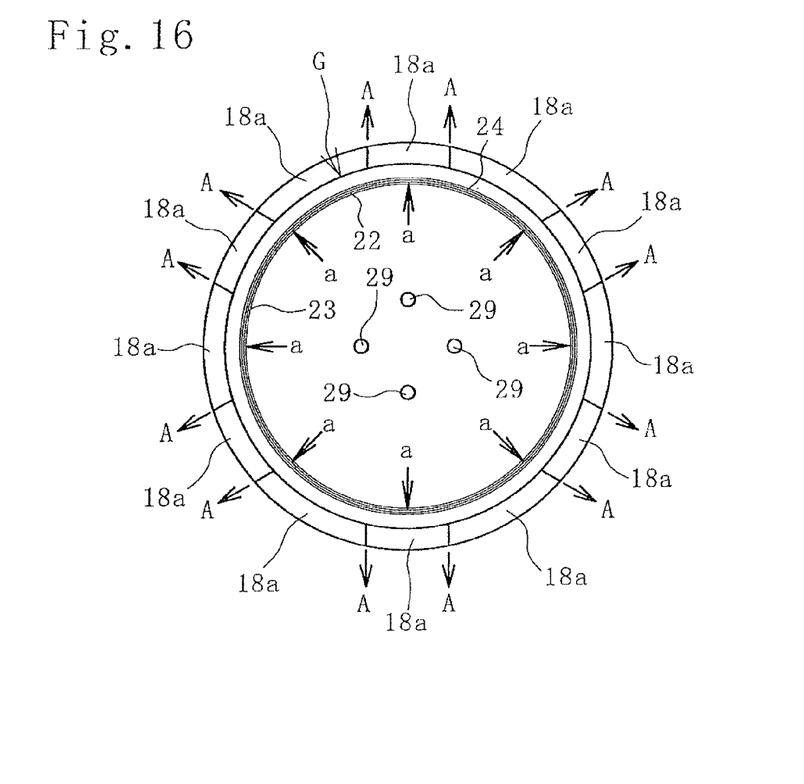
FIG. 16 is a cross-sectional view taken along C-C in FIG. 15.

By inflating the film 22, unvulcanized rubber in the tire constituting members is pressed against the inner peripheral surface of the sector (curing mold) 18a as illustrated in FIG. 16, and accordingly flows in the circumferential direction of the sector 18a. Consequently, even when non-uniformity in the volume of the tire constituting members of the green tire G exists, the non-uniformity can be corrected, and uniformity of the pneumatic tire 21 to be manufactured can be improved.

Along with the curing of the green tire G, the film 22 is brought into close contact with and bonded to the inner peripheral surface of the tire (rubber members disposed in the outer peripheral side of the film 22) so that the pneumatic tire 21 having the film 22 as the inner layer is manufactured. In this manner, the pneumatic tire 21 with excellent uniformity, having an inner layer which is light in weight and excels in air penetration preventing performance can be efficiently manufactured.

At the time of curing, it is preferable that the air A should be forcibly sucked from the inside of the curing mold to the outside so that the green tire G is cured in a negative pressure state. For example, vacuum is drawn by a vacuum pump through the mating face of adjacent sectors (curing mold) 18a. In this manner, the air between the stacked tire constituting members, or the air in the tire constituting members (rubber members) can be removed, and thus a problem due to trapped air in manufactured pneumatic tire 21 can be prevented, thereby its quality can be improved.

In order to increase the bonding power between the film 22 and the inner peripheral surface of the tire, an adhesive layer may be previously provided on the outer peripheral surface of the film 22. The tie rubber 23 is disposed to cover the entire outer peripheral surface of the film 22, but the tie rubber 23 may be disposed to cover a part of the outer peripheral surface of the film 22. If a certain bonding strength between the film 22 and the members on the outer peripheral side of the film 22 can be secured, the tie rubber 23 may be omitted.

In this embodiment, the film 22 serves as a conventional bladder, and thus maintenance of the bladder is not needed, which is advantageous to the improvement of productivity.

The curing mold can be heated by various heat sources. For example, an electric heating body embedded in the curing mold may be used. Heating by an electric heating body enables a precise temperature control.

In this curing process, the outer peripheral surface of the green tire G is molded into a predetermined shape by the sector 18a, the inner peripheral surface is brought into contact with and molded by the inflated film 22. Accordingly, unlike the manufacturing method which uses a conventional bladder made of rubber, or the manufacturing method which presses the green tire on the outer peripheral surface of the rigid inner mold, no undesired marks are left on the inner peripheral surface of the cured pneumatic tire, whereby a smooth surface is created, and accordingly appearance quality is improved.

Moreover, when the green tire G is cured, the rigid inner mold 11 is not disposed inside the curing mold, and thus the rigid inner mold 11 can be freely used during the curing. Consequently, the number of green tires G that can be molded by one rigid inner mold 11 within a predetermined time period increases, and thus productivity can be improved by effectively using the rigid inner mold 11. Accordingly, the number of the rigid inner molds 11 to be prepared can be reduced.

Figure 17:
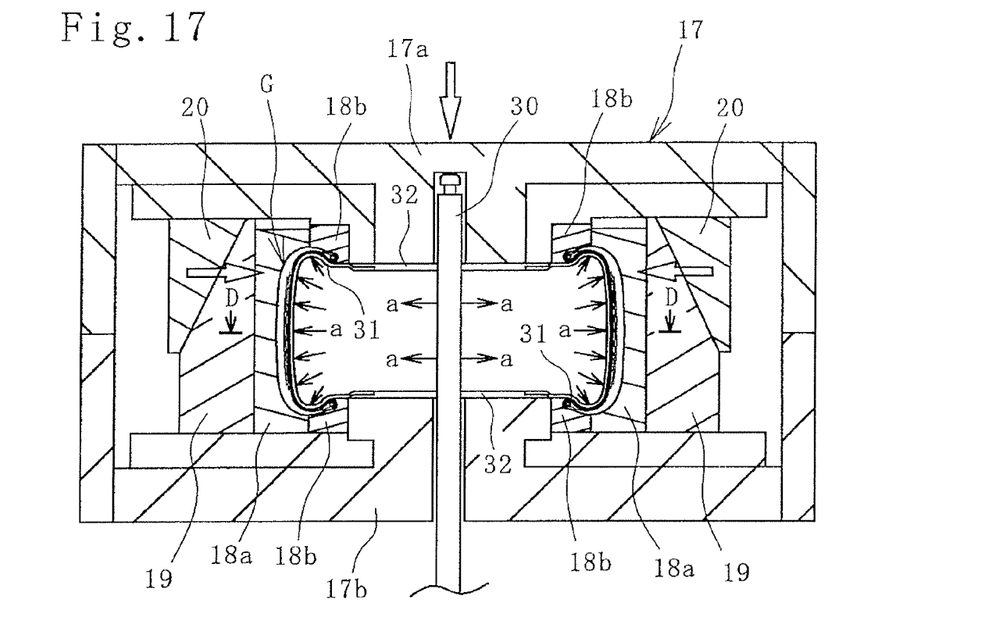
FIG. 17 is a vertical sectional view illustrating the state of curing the green tire using a bladder.

The green tire G molded by using the rigid inner mold 11 can be cured using a bladder 31 as illustrated in FIG. 17. Two disc-shaped bladder holding plates 32 are attached to a center post 30 which is inserted inside the tubular hole formed at the central portion of the top housing 17*a* and the bottom housing 17*b*. Elastic material such as rubber, or the bladder 31 formed by embedding reinforcing material such as a canvas layer into elastic material is fixed to the outer peripheral edge portion of the bladder holding plates 32.

The bladder 31 is formed to have the same shape as the inner peripheral hollow portion of the green tire G when the bladder 31 is inflated. That is to say, the outside shape of the bladder 31 is formed in approximately the same size and shape as the inner peripheral hollow portion of the green tire G.

To cure the green tire G, the bladder 31 is placed in its contracted state in the inner peripheral hollow portion of the green tire G disposed in a predetermined position of the curing mold. Subsequently, the top housing 17*a* is moved downward, and the sectors 18*a* are assembled to form an annular shape. The upper side plate 18*b*, which is moved downward, is disposed at the upper inner periphery portion of the sectors 18*a* assembled to form an annular shape. The upper bead portion comes in contact with the upper side plate 18*b*.

Next, the curing mold is heated to a predetermined temperature, while heated fluid such as the heated air a which is heated through a communication hole provided in the center post 30 is supplied to the bladder 31 and is expanded. By the expanded bladder 31, the film 22 is pressurized from the inner peripheral side to be inflated while being heated.

The bladder 31 has approximately the same size and shape as the inner peripheral hollow portion of the green tire G, and thus is brought into close contact with the entire inner peripheral surface of the green tire G. However, the bladder 31 slightly presses against the inner peripheral surface of the green tire G (the film 22). In this manner, the film 22 is inflated, while being heated, and thus the green tire G is cured.

Figure 18:
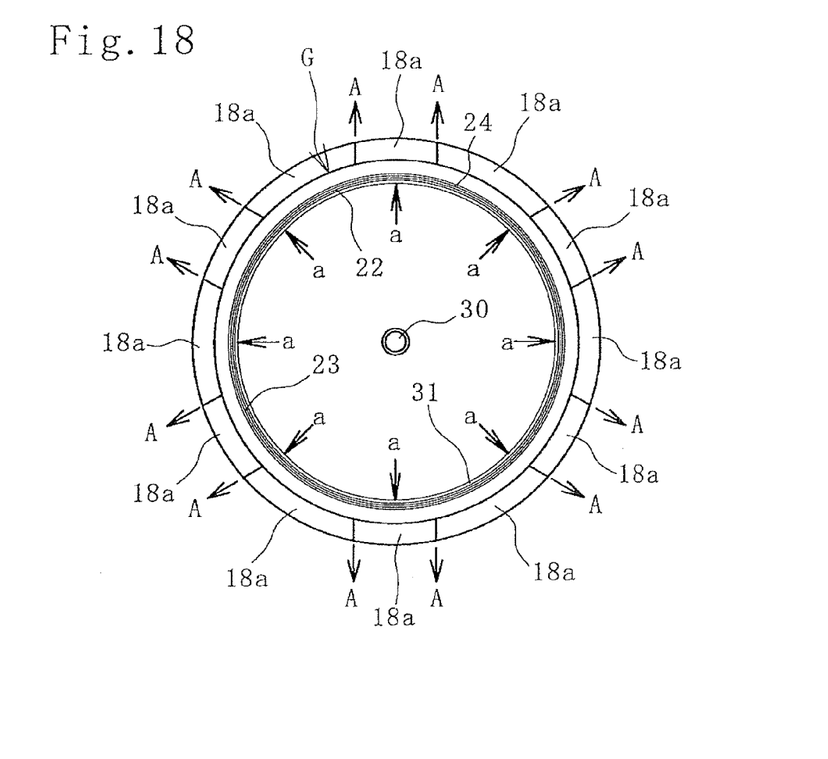
FIG. 18 is a cross-sectional view taken along D-D in FIG. 17.

In this embodiment also, the film 22 is inflated, and thus, as illustrated in FIG. 18, unvulcanized rubber in the tire constituting members is pressed against the inner peripheral surface of the sector (curing mold) 18*a*, and accordingly, flows in the circumferential direction of the sector 18*a*. Consequently, even when non-uniformity in the volume of the tire constituting members of the green tire G exists, the non-uniformity can be corrected, and uniformity of the pneumatic tire 21 to be manufactured can be improved. The film 22 is brought into close contact with and bonded to the inner peripheral surface of the tire so that the pneumatic tire 21 having the film 22 as the inner layer is manufactured.

In this embodiment also, at the time of curing, the air A may be forcibly sucked from the inside of the curing mold to the outside so that the green tire G is cured in a negative pressure state.

In the case of this embodiment, the bladder 31 is used, and thus heated fluid does not directly come in contact with the inner peripheral surface of the green tire G. Accordingly, various types of heated fluid can be used.

In the above-mentioned various embodiments, the cases where radial tires are manufactured are taken as examples, however, the present invention can be even applied to the case of manufacturing bias tires.

What is claimed is:

1. A method of manufacturing a pneumatic tire, comprising:
   forming a primary molded body by fitting bead rings on opposite ends, in a width direction, of a cylindrical-shaped body in which at least a carcass material is mounted on an outer peripheral side of a film formed of a thermoplastic resin or a thermoplastic elastomer composition obtained by blending a thermoplastic resin with an elastomer;
   sucking and holding the primary molded body to an inner peripheral surface of a transfer and holding mold;
   inserting a cylindrical-shaped rigid inner mold including multiple divided bodies inside the primary molded body, thereafter stopping suction by the transfer and holding mold, and transferring the primary molded body to an outer peripheral surface of the rigid inner mold;
   turning up opposite ends of the carcass material in a width direction thereof on the rigid inner mold, while other tire constituting members are stacked on an outer peripheral surface of the primary molded body so that a green tire is molded;
   detaching the rigid inner mold from the green tire, thereafter disposing the green tire inside a curing mold installed in a curing apparatus, and heating the curing mold to a predetermined temperature; and
   pressurizing the film from an inner peripheral side to be inflated while being heated to cure the green tire, and bringing the film into close contact with and bonded to an inner peripheral surface of the tire.

2. The method of manufacturing a pneumatic tire according to claim 1, further comprising
   expanding a bladder which, when being expanded, has a same shape as an inner peripheral hollow portion of the green tire, by heated fluid in the inner peripheral hollow portion of the green tire disposed inside the curing mold, whereby the film is pressurized from an inner peripheral side to be inflated, while being heated.

3. The method of manufacturing a pneumatic tire according to claim 1, wherein
   the pressurizing includes injecting heated fluid directly into an inner peripheral surface of the green tire disposed inside the curing mold, such that the film is pressurized to be inflated while being heated.

4. The method of manufacturing a pneumatic tire according to claim 1, wherein
   when the primary molded body is sucked and held to the inner peripheral surface of the transfer and holding mold, the transfer and holding mold is disposed at an outer peripheral side of the primary molded body, and the primary molded body is pressurized from an inner peripheral side of the primary molded body, while the primary molded body is sucked by the transfer and holding mold from an outer peripheral side of the primary molded body.

5. The method of manufacturing a pneumatic tire according to claim 1, wherein
   when the green tire is cured, the film is pressurized to be inflated from an inner peripheral side with a pressure of 0.01 MPa to 3.0 MPa.

6. The method of manufacturing a pneumatic tire according claim 1, further comprising
sucking air from an inside of the curing mold to an outside, while a green tire disposed inside the curing mold is cured.

7. The method of manufacturing a pneumatic tire according to claim 2, wherein
when the primary molded body is sucked and held to the inner peripheral surface of the transfer and holding mold, the transfer and holding mold is disposed at an outer peripheral side of the primary molded body, and the primary molded body is pressurized from an inner peripheral side of the primary molded body, while the primary molded body is sucked by the transfer and holding mold from an outer peripheral side of the primary molded body.

8. The method of manufacturing a pneumatic tire according to claim 3, wherein
when the primary molded body is sucked and held to the inner peripheral surface of the transfer and holding mold, the transfer and holding mold is disposed at an outer peripheral side of the primary molded body, and the primary molded body is pressurized from an inner peripheral side of the primary molded body, while the primary molded body is sucked by the transfer and holding mold from an outer peripheral side of the primary molded body.

9. The method of manufacturing a pneumatic tire according to claim 2, wherein
when the green tire is cured, the film is pressurized to be inflated from an inner peripheral side with a pressure of 0.01 MPa to 3.0 MPa.

10. The method of manufacturing a pneumatic tire according to claim 3, wherein
when the green tire is cured, the film is pressurized to be inflated from an inner peripheral side with a pressure of 0.01 MPa to 3.0 MPa.

11. The method of manufacturing a pneumatic tire according to claim 4, wherein
when the green tire is cured, the film is pressurized to be inflated from an inner peripheral side with a pressure of 0.01 MPa to 3.0 MPa.

12. The method of manufacturing a pneumatic tire according claim 2, further comprising
sucking air from an inside of the curing mold to an outside, while a green tire disposed inside the curing mold is cured.

13. The method of manufacturing a pneumatic tire according claim 3, further comprising
sucking air from an inside of the curing mold to an outside, while a green tire disposed inside the curing mold is cured.

14. The method of manufacturing a pneumatic tire according claim 4, further comprising
sucking air from an inside of the curing mold to an outside, while a green tire disposed inside the curing mold is cured.

15. The method of manufacturing a pneumatic tire according claim 5, further comprising
sucking air from an inside of the curing mold to an outside, while a green tire disposed inside the curing mold is cured.

16. The method of manufacturing a pneumatic tire according to claim 7, wherein
when the green tire is cured, the film is pressurized to be inflated from an inner peripheral side with a pressure of 0.01 MPa to 3.0 MPa.

17. The method of manufacturing a pneumatic tire according to claim 8, wherein
when the green tire is cured, the film is pressurized to be inflated from an inner peripheral side with a pressure of 0.01 MPa to 3.0 MPa.

18. The method of manufacturing a pneumatic tire according claim 7, further comprising
sucking air from an inside of the curing mold to an outside, while a green tire disposed inside the curing mold is cured.

19. The method of manufacturing a pneumatic tire according claim 16, further comprising
sucking air from an inside of the curing mold to an outside, while a green tire disposed inside the curing mold is cured.

20. The method of manufacturing a pneumatic tire according claim 17, further comprising
sucking air from an inside of the curing mold to an outside, while a green tire disposed inside the curing mold is cured.

* * * * *